3,270,372
EXTRUSION MOLDING MACHINE
Heinrich Hesse, Rheydt, Germany, assignor to Mannesmann-Meer Aktiengesellschaft, Monchen Gladbach, Germany, a corporation of Germany
Filed Aug. 21, 1963, Ser. No. 303,477
Claims priority, application Germany, Apr. 30, 1963, M 56,649
1 Claim. (Cl. 18—30)

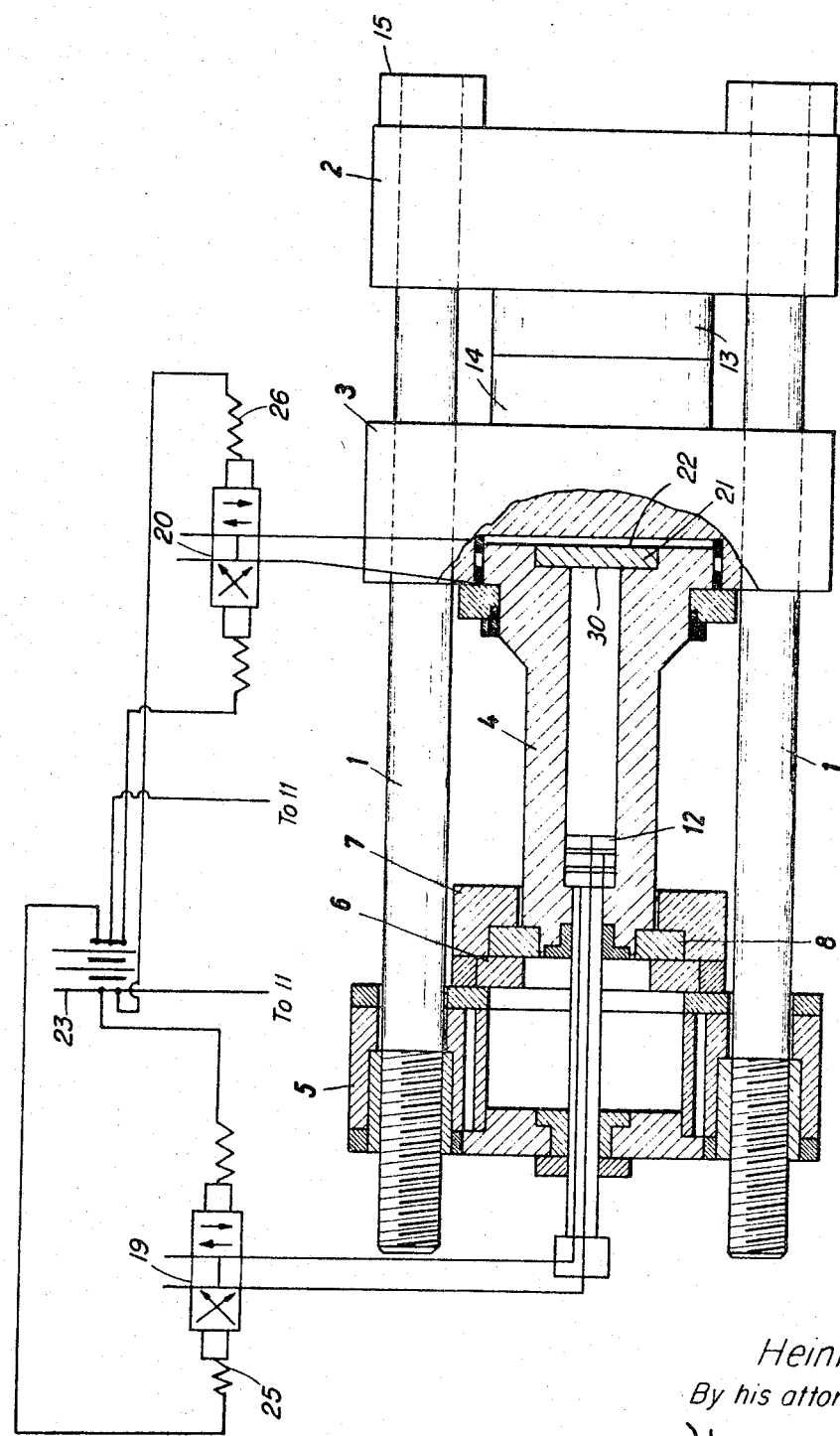

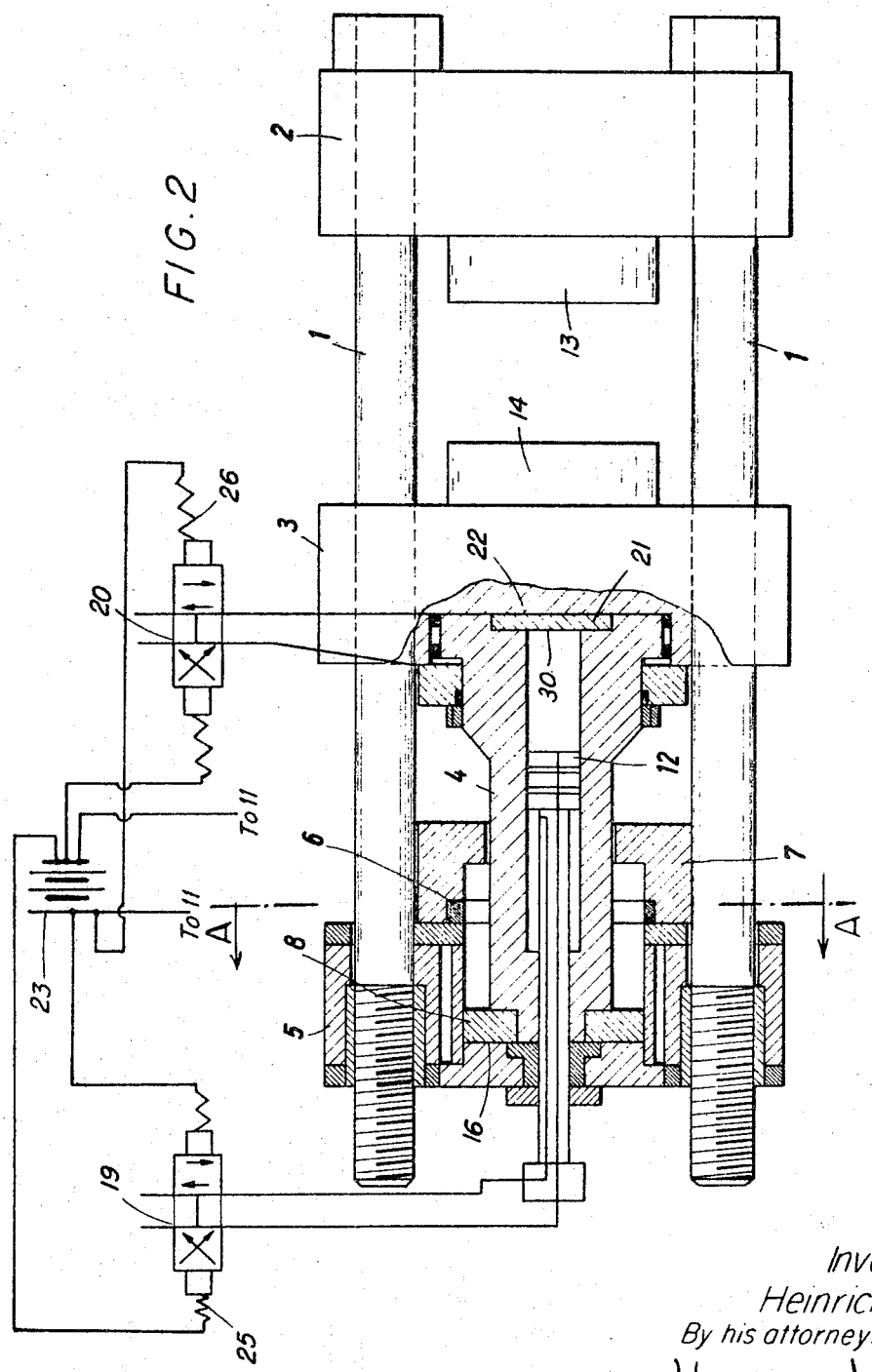

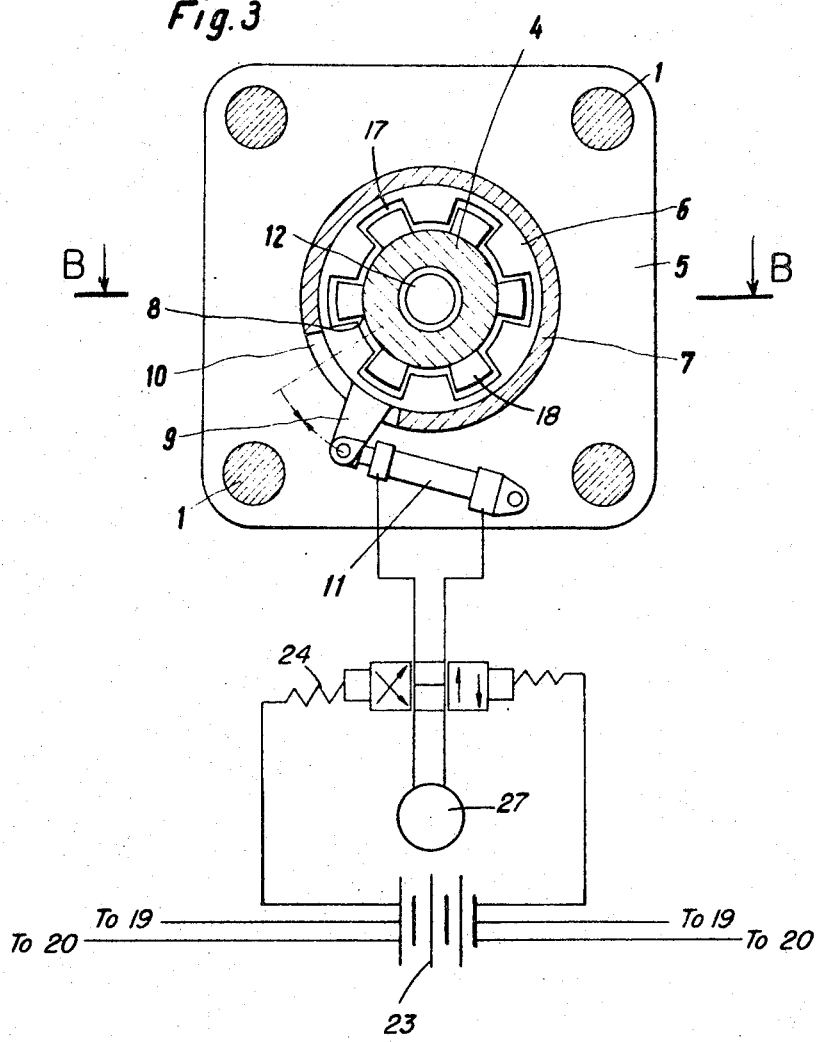

This invention concerns an extrusion molding machine for locking the movable mold segment thereof shut during and against the force of injection. In particular, the device is adapted for use in extrusion molding equipment that processes synthetic thermoplastic materials. Such equipment generally has one stationary mold part and one movable mold part, in accordance with the aforesaid and usual practice.

In extrusion molding machines, relatively low pressure suffices to advance the movable mold-half to a point just short of the clamp-up position. Thereafter, the mold segments can be brought together and clamped-up only with use of considerable pressure. During the extrusion molding operation the mold as a whole must be maintained in clamped-up position in order to counteract the very substantial force of injection present within the mold. The maintaining of the mechanism is this clamped-up position during molding is understood to be a locking-up thereof.

Efforts have been made to design machines that will counteract the considerable injection force involved. Machines embodying angle-levers; supporting surfaces with pairs of links; or toggle levers, are examples of known designs used in efforts to counteract the force of injection.

Electric contacts are used in conjunction with hydraulic equipment to increase the mold locking-up pressures by alternately increasing and decreasing pulses directed to the associated control elements. Use is also made of lateral sliders, operated by hydraulic means, for locking up the mold.

This invention is an impovement on the U.S. patent application of Wolfgang Ohlendorf and Edward Schultes for a Hold Shut Device for Exterior Molding, filed June 4, 1963, Serial No. 285,474.

When used over a period of time the mold locking-up mechanisms mentioned above fail to exhibit the necessary reliability of movements which would make them uniform in action. They are unable to maintain the precise tolerances essential for the accurate positioning of the traversing mold-half.

Commercial need exists for means that eliminate the drawbacks just recited.

The object of the invention is to provide an improved locking device for extrusion molding equipment such as has been discussed above so that it combines a simple form of construction with long life, and so that it operates with a high degree of accuracy and reliability.

According to the invention, the locking device is basically the familiar bayonet-type mechanism. An hydraulic cylinder, electrically controlled through resistors, operates the device. Cooperatively with said device and a stationary shift piston other resistor controlled hydraulic powe sources move the traversing mold-half and the sliding shift cylinder associated therewith into and out from mold clamp-up position. The locking device is preferably constructed to be used in conjunction with the extrusion molding apparatus detailed in the present description and drawings.

The accompanying drawings, FIGS. 1 to 3, show, by way of example, the use of the bayonet-type locking device of the invention in various stages of operation of the machine.

FIG. 1 is a plan view of the extrusion molding machine and shows the mold clamped-up and locked according to the invention.

FIG. 2 is a plan view of the apparatus in FIG. 1 showing them old unlocked and opened; the view being taken on the section A—A of FIG. 2 looking in the direction of the arrows.

FIG. 3 is an end view in cross section of the apparatus of FIGS. 1 and 2, showing the hydraulic cylinder for turning the bayonet ring; the bayonet ring; the bayonet mount; the toothed abutment ring; and the associated cylinder-to-bayonet-ring linkage; the section portion being taken on the section line B—B of this figure looking in the direction shown by the arrows.

The construction of the machine shown in the drawings is as follows:

As shown by FIG. 1, stationary tool plate 2 and moldhalf 13 rigidly fixed thereto are firmly mounted on guide bars 1 by hollow nuts 15. A second and traversing tool plate 3 forms a unit with a second mold-half 14 and sliding shift cylinder 4, disposed so that the entire unit moves as the tool plate 3 traverses along the guide bars. A supporting end plate 5 is adjustably mounted on the guide bars so as to determine the effective length thereof. This end plate carries most of the bayonet-type locking device, and as such serves as the structure that receives the impact of the pressures of clamping-up and locking-up. The locking device is formed of a rotatable bayonet ring 6 having cut-outs 17 therearound, and of a bayonet holder or mount 7. A toothed abutment ring 8 is immovably screwed to the sliding shift cylinder 4. The teeth of this ring are shown by the numeral 18. Through a lever 9 (FIG. 3) extending from the bayonet ring 6, and moving in a recess 10 in the bayonet mount 7, and hydraulic cylinder 11 turns the bayonet ring 6 with relation to the toothed abutment ring 8. An electrical energy source 23 controls the hydraulic cylinder 11 through resistors 24.

A stationary shift piston 12 is immovably installed through the supporting end plate 5 and in the sliding shift cylinder 4. This piston fits within the sliding shift cylinder, forming two cylinder chambers, as seen in FIGURE 2. This figure also shows how the piston 12 helps to support conduits which supply and evacuate hydraulic fluid to and from these chambers. Such fluid is directed into the appropriate chambers through the conduits, by hydraulic apparatus including cylinder 19. The aforesaid hydraulic mechanism effects the approach and withdrawal strokes of the shift cylinder 4. The electrical energy source controls this cylinder through resistors 25. The hydraulic cylinder and apparatus indicated by 20 and controlled by the electrical energy source through resistors 26 break the mold open after unlocking, by application of very great force against the withdrawal face 22 of hold-shut piston 21 also housed within the sliding shift cylinder and mounted directly on the traversing mold-half. The face 30 of piston 21 may be conveniently described as the clamp-up face of this piston. It is apparent from the drawings that the clamp-up phase of operation is accomplished by directing the fluid flow from cylinder 20 against the clamp-up face 30 of piston 21 instead of withdrawal face 22.

Hydraulic fluid from a conventional hydraulic fluid supply (not shown) is connected to the cylinders by conduits, as noted above and shown in the drawings, and to cylinder 11 through a low pressure circuit which is shown by numeral 27.

Having described the construction of the locking device as associated with the rest of the extrusion molding machine, I shall now describe the operation of this combination, with the aid of the drawings, as follows.

FIG. 2 shows the traversing mold-half withdrawn from the stationary mold-half; that is, the mold is unlocked.

This unlocking is initiated by the hydraulic cylinder 11 after clamp-up and lock-up pressures have been relieved through the aforesaid hydraulic conduits. Acting through lever 9 the hydraulic cylinder 11 turns the bayonet ring through a predetermined arc so that the teeth 18 of the abutment ring 8 assume a position exactly in line with the cut-outs 17 of the bayonet ring 6. The way is thus cleared for the withdrawal of the sliding shift cylinder 4, the traversing mold-half 14, and the hold-shut piston 21. As the fluid column in that cylinder chamber which is most proximate the supporting end plate 5 increases and as fluid is forced against withdrawal face 22 of the hold-shut piston, breakaway of the traversing mold-half occurs, followed by withdrawal of the traversing mold-half and the sliding shift cylinder. This withdrawal continues until the shift cylinder comes up against a stop 16 in the supporting end plate 5.

The reverse of this process, i.e. closure of the mold, clamp-up and lock-up begins as low pressure fluid is introduced into that cylinder chamber which is most proximate the stationary shift piston and on the mold side thereof. This occurs as the cylinder most proximate the supporting end plate is relieved of fluid. The sliding shift cylinder is thereby caused to shift forward, or advance. This advance of the sliding shift cylinder continues until the toothed abutment ring 8 strikes against the bayonet mount 7. The hydraulic cylinder 11 then turns the bayonet ring 6 back through the same arc as was involved in the unlocking phase of operation, so that the cut-outs 17 of the bayonet ring 6 rotate past the teeth of the abutment ring 8, and thus lock the sliding shift cylinder 4 against motion in either of the two longitudinal directions. Clamp-up pressure increases as fluid is forced against face 30 of piston 21, advancing that piston, and is taken through the intermediary of the sliding shift cylinder 4 with its abutment ring 8, by the bayonet ring 6 carried by the supporting end plate 5. The arrangement of the apparatus of the invention provides that the clamp-up pressure places tensile stress on the guide bars, and along with the tool plates forms a complete structural unit.

It is to be understood that the preferred embodiment of the invention, as described above and in the claim that follows, is not intended to limit the scope of the invention thereto. Modifications not here suggested, which may occur to those normally skilled in the art are also considered to be within the ambit of the invention.

What is claimed is:

An extrusion molding machine to process synthetic thermoplastic materials comprising
- a frame with guide bars,
- a tool plate fixedly mounted to the frame,
- a stationary mold-half fixed on the tool plate,
- a second tool plate mounted slidably on the frame,
- a traversing mold-half on the slidable tool plate and a sliding shift cylinder, both mold-half and cylinder being mounted as a unit,
- a source of electrical energy,
- an hydraulic fluid supply,
- a stationary shift piston fitted within the shift cylinder,
- a supporting end plate attached to the frame at that point which is most remote from the stationary mold-half unit at full open position,
- shift cylinder and traversing mold-half unit operating means,
- in combination with a rotary mechanism mounted concentrically with respect to the shift cylinder to lock the mold halves together comprising
- a bayonet mount abutting the supporting end plate and carried thereon,
- a toothed abutment ring immovably fixed to the shift cylinder so as to slide therewith,
- a notched bayonet ring disposed in the bayonet mount and rotatable relatively to the toothed abutment ring,
- an actuating lever connected to the notched bayonet ring,
- and hydraulic drive apparatus connected to the actuating lever to operate the rotary locking mechanism.

References Cited by the Examiner
UNITED STATES PATENTS

| | | | |
|---|---|---|---|
| 982,473 | 1/1911 | Canedy | 285—396 X |
| 1,851,138 | 3/1932 | Smith | 18—16 |
| 2,689,978 | 9/1954 | Roger | 22—92 X |
| 2,711,561 | 6/1955 | Studli | 18—30 |
| 2,862,238 | 12/1958 | Cuzzi | 18—30 |
| 3,120,039 | 2/1964 | Stubbe et al. | |
| 3,156,014 | 11/1964 | Wanger | 18—30 |

J. SPENCER OVERHOLSER, *Primary Examiner.*

MICHAEL V. BRINDISI, *Examiner.*

W. L. McBAY, Assistant Examiner.